United States Patent [19]

Hosoya

[11] 4,216,493
[45] Aug. 5, 1980

[54] CHROMINANCE SIGNAL PROCESSING CIRCUIT IN COLOR TELEVISION RECEIVER

[75] Inventor: Nobukazu Hosoya, Nara, Japan

[73] Assignee: Sanyo Electric Co., Ltd., Osaka, Japan

[21] Appl. No.: 954,667

[22] Filed: Oct. 25, 1978

[30] Foreign Application Priority Data

Oct. 26, 1977 [JP] Japan .................. 52/128862
Mar. 16, 1978 [JP] Japan .................. 53/31239

[51] Int. Cl.$^2$ ........................................... H04N 9/535
[52] U.S. Cl. ........................................ 358/28; 358/27
[58] Field of Search ................ 358/27, 17, 19, 23, 358/25, 28, 40

[56] References Cited

U.S. PATENT DOCUMENTS

| 3,673,320 | 6/1972 | Carnt et al. ................ 358/28 |
| 4,101,927 | 7/1978 | Isono et al. ................ 358/27 |

Primary Examiner—Richard Murray
Attorney, Agent, or Firm—Armstrong, Nikaido, Marmelstein & Kubovcik

[57] ABSTRACT

A chrominance signal processing circuit in a color television receiver which comprises a bandpass amplifier, a burst gate pulse source, a subcarrier generator, a 90° phase shifter for phase shifting the generated subcarrier, a B - Y demodulator and an R - Y demodulator both coupled to the bandpass amplifier and separately coupled to the subcarrier generator and the 90° phase shifter, respectively, characterized in that a flip-flop is provided responsive to the burst gate pulse to alternately provide a first and second selected burst gate pulses, the B - Y and R - Y demodulators are structured to provide a burst magnitude representing signal and a subcarrier phase drift representing signal, respectively, in the line blanking period and to be disabled responsive to the first and second selected burst gate pulses, respectively, an automatic color control sample and hold circuit is provided to be enabled to the second burst gate pulse to hold the burst magnitude representing output of the B - Y demodulator to supply the held level signal to the bandpass amplifier as a gain control signal, and an automatic phase control sample and hold circuit is provided to be enabled responsive to the first selected burst gate pulse to hold the subcarrier phase drift representing output of the R - Y demodulator to supply the held level signal to the subcarrier generator as a frequency control signal. Preferably a color gain control and tint control are provided, which are structured to be responsive to the burst gate pulse to be disassociated with the bandpass amplifier and the subcarrier generator.

14 Claims, 6 Drawing Figures

CHROMINANCE SIGNAL PROCESSING CIRCUIT IN COLOR TELEVISION RECEIVER

BACKGROUND OF THE INVENTION

1. Field of the Invention

The present invention relates to a chrominance signal processing circuit in a color television receiver. More specifically, the present invention relates to an improvement in an automatic color control and an automatic phase control in a color television receiver.

2. Description of the Prior Art

As well known, a composite color television signal comprises a luminance signal and a chrominance signal suppression modulated on a subcarrier in a line scanning period, apart from a horizontal and vertical synchronizing signals in a blanking period and a burst signal at the back porch of the horizontal synchronizing signal. In a typical color television receiver, a luminance signal, horizontal and vertical synchronizing signals, and a chrominance signal plus a burst signal are separated for the purpose of signal processing. For the purpose of processing a chrominance signal, a composite chrominance signal including a chrominance signal suppression modulated on a subcarrier and a burst signal is provided. On the other hand, a burst gate pulse is also provided to sample a burst signal in the composite chrominance signal. A subcarrier is locally generated responsive to the sampled burst signal and the original color signals are demodulated responsive to the chrominance signal and as a function of the locally generated subcarrier.

FIG. 1 shows a block diagram of a typical prior art chrominance signal processing circuit in a color television receiver. Referring to FIG. 1, a composite chrominance signal including a burst signal is applied to a bandpass transformer 1 adjusted to cover the frequency band of the composite chrominance signal. The output of the bandpass transformer 1 is applied to a first bandpass amplifier 2 and further to a second bandpass amplifier 3, wherein the composite chrominance signal is amplified. The output of the second bandpass amplifier 3 is applied to a color gain control, wherein the gain of the bandpass amplifiers 2 and 3 is adjusted. The chrominance signal thus amplified and gain adjusted is applied to an R-Y demodulator 5 and a B-Y demodulator 6, wherein an R-Y color difference signal and a B-Y color difference signal are demodulated as a function of a subcarrier obtained through a line 13 and a subcarrier obtained from a line 11, respectively, both of which have a phase difference of 90° to be described subsequently. More specifically, a subcarrier of the frequency 3.58 MHz is generated by a subcarrier generator 8 and is first applied to a hue or tint control 9, wherein the phase of the subcarrier is manually adjusted by means of a tint control variable resistor 10. The output of the tint control 9 is applied through the line 11 to the B-Y demodulator 6. On the other hand, the output of the tint control 9 is applied to a 90° phase shifter 20, wherein the original subcarrier is phase shifted by 90°. The output of the 90° phase shifter 12 is applied through the line 13 as another subcarrier to the R-Y demodulator 5. The output of the R-Y demodulator 5 and the output of the B-Y demodulator 6 are applied to a G-Y matrix 7, wherein the R-Y color difference signal and the B-Y color difference signal are subjected to an arithmetic operation to provide a G-Y color difference signal.

As well known, various automatic controls such as an automatic color control, an automatic phase control, an automatic color disabling control and the like are employed in a chrominance signal processing circuit. Referring to FIG. 1, an automatic color control will be first described. An automatic color control comprises a burst gate circuit 14 responsive to the burst gate pulse to gate only a burst signal in a composite chrominance signal obtainable from the first bandpass amplifier 2 to provide only a burst signal and a detector 15 for detecting the magnitude of the burst signal obtainable from the burst gate circuit 14 to provide the detected output representing the magnitude of the burst signal through a line 16 to the first bandpass amplifier 2 as a voltage control signal. For the purpose of automatic color control, the first bandpass amplifier 2 is structured in a voltage controlled variable gain amplifier. Therefore, the gain of the first bandpass amplifier 2 is controlled as a function of the output of the detector 15 and thus as a function of the magnitude of the burst signal. Thus, the overall gain of the amplifiers 2 and 3 and the control 4 is automatically controlled as a function of the magnitude of the burst signal. This type of automatic gain control is often referred to as an automatic color control. In FIG. 1, the automatic color control detector 15 is implemented by a synchronous detector operable as a function of the output from the subcarrier generator 8. Thus, the detector 15 is shown responsive to both the output of the burst gate circuit 14 and the output of the subcarrier generator 8.

The output obtainable from the automatic color control detector 15 is not only representative of the magnitude of the burst signal but also of the presence or absence of the burst signal. Therefore, the output obtained through the line 16 from the automatic color control detector 15 is also applied to a color disabling circuit 17 and the output from the color disabling circuit 17 is applied to the second bandpass amplifier 3, so that the second bandpass amplifier 3 is disabled if and when no output is obtained from the automatic color control detector 15 representing the absence of the burst signal and is enabled only when the output representing the presence of the burst signal is obtained from the automatic color control detector 15. This type of automatic color disabling control is often referred to as "color killer".

For the purpose of an automatic hue or phase control, the subcarrier generator 8 is implemented by a voltage controlled variable frequency oscillator and the output of the voltage controlled oscillator 8 is applied through a 90° phase shifter 18 to a phase detector 19, which is also connected to receive the burst signal obtained from the burst gate circuit 14. The phase detector 19 serves to detect the phase difference of the burst signal from the burst gate circuit 14 and of the output of the 90° phase shifter 18. The detected output from the phase detector 19 is applied through an amplifier 20 to the voltage controlled oscillator 8 as a voltage control signal. A closed loop including the voltage controlled oscillator type subcarrier generator 8, the phase detector 19 and the amplifier 20 automatically controls the phase of the output of the subcarrier generator 8 and is often referred to as an automatic phase control.

According to the above described automatic phase control, the output of the first bandpass amplifier 2 is first applied to the burst gate circuit 14, where only the burst signal is sampled or gated and the gated burst signal is used to detect by means of the phase detector 19 the phase of the subcarrier generated by the voltage controlled oscillator type subcarrier generator 8, whereupon the output of the phase detector 19 is applied through the amplifier 20 to the subcarrier generator 8. However, this type of automatic phase control has not taken full advantage of an automatic phase control, inasmuch as no consideration has been paid to a phase drift in the tint control 9, the demodulators 5 and 6, the second bandpass amplifier 3, the color gain control 4 and the like. Conventionally, various countermeasures were taken to eliminate such phase drift as much as possible in the respective circuits. In addition, in order to match the phase of the subcarrier with that of the chrominance signal, a phase compensation circuit 21 was required, because no circuits corresponding to the tint control 9 and the demodulators 5 and 6 were not included in the closed loop for the automatic phase control. Thus, the conventional circuit has an undesirably increased number of portions being adjusted. In addition, the feature of a less temperature drift of the automatic phase control was not effectively utilized.

Similarly, in case of a color gain or color saturation as well, a gain drift in the second bandpass amplifier 3, the color gain control 4, the demodulators 5 and 6, and the like was not automatically corrected, because the above described circuits were not included in the closed loop of the automatic gain control and as a result a gain drift in such circuits caused a variation of the color.

SUMMARY OF THE INVENTION

Briefly described, the present invention comprises a chrominance signal processing circuit in a color television receiver, comprising bandpass amplifying means of a voltage controlled variable gain type for amplifying a chrominance signal, burst gate pulse source means, subcarrier generating means of a voltage controlled variable frequency oscillator type, and color demodulating means coupled to the bandpass amplifying means and the subcarrier generating means, characterized in that first chrominance demodulating means is provided responsive to the chrominance signal and subcarrier signal for providing a first chrominance demodulated signal in the line scanning period and for providing a first signal representing the magnitude of the chrominance signal in the blanking period, second chrominance demodulating means is provided responsive to the chrominance signal and the subcarrier signal for providing a second chrominance demodulated signal in the line scanning period and for providing a second signal representing the phase drift of the subcarrier signal in the blanking period, first sample and hold means is provided responsive to the burst gate pulse to be enabled and responsive to the first chrominance demodulating means for sampling the first magnitude representing signal and holding a first level signal representing the first magnitude representing signal, the first level signal being applied to the bandpass amplifying means as a voltage control signal, and second sample and hold means is provided responsive to the burst gate pulse to be enabled and responsive to the second chrominance demodulating means for sampling the second phase drift representing signal and holding a second level signal representing the second phase drift representing signal, the second level signal being provided to the subcarrier generating means as a voltage control signal. According to the present invention, an automatic color control signal and an automatic phase control signal are obtained by the use of the chrominance demodulating means. Therefore, any disadvantages encountered in the above described conventional chrominance signal processing circuit are eliminated.

In a preferred embodiment, means is provided responsive to the burst gate pulse source means for providing first and second selected burst gate pulses which are complementary to each other, the first chrominance demodulating means is structured to be disabled and the first sample and hold means is structured to be enabled responsive to the first selected burst gate pulse for the time period of the first selected burst gate pulse, the second chrominance demodulating means is structured to be disabled and the second sample and hold means is structured to be enabled responsive to the second selected burst gate pulse for the time period of the second selected burst gate pulse, the first sample and hold means is further structured to compare the outputs of the first and second chrominance demodulating means using the latter as a reference and the second sample and hold means is further structured to compare the outputs of the second and first chrominance demodulating means using the latter as a reference.

In a preferred embodiment of the present invention, means is provided coupled to the bandpass amplifying means for adjusting the gain of the bandpass amplifying means and further means is provided coupled to the adjusting means and responsive to the burst gate pulse for making the bandpass amplifying means irresponsive to the adjusting means in the time period of the burst gate pulse.

In a preferred embodiment of the present invention, means is provided coupled to the subcarrier generating means for adjusting the phase of the output of the subcarrier generating means and further means is provided coupled to the phase adjusting means and responsive to the burst gate pulse for making the subcarrier generating means irresponsive to the phase adjusting means in the phase period of the burst gate pulse.

Accordingly, a principal object of the present invention is to provide an improved automatic color control and automatic phase control in a chrominance signal processing circuit in a color television receiver.

Another object of the present invention is to simplify adjustment of a phase relationship in an automatic color control and an automatic phase control in a chrominance signal processing circuit in a color television receiver.

A further object of the present invention is to make a bandpass amplifying means irresponsive to a gain adjusting means in a chrominance signal processing circuit in a color television receiver.

Still a further object of the present invention is to make a subcarrier generating means irresponsive to a phase adjusting means in a chrominance signal processing circuit in a color television receiver.

Another object of the present invention is to provide a simplified circuit configuration of a chrominance signal processing circuit including an automatic color control and an automatic phase control in a color television receiver.

Still another object of the present invention is to provide an improved chrominance signal processing circuit in a color television receiver including an automatic color control and an automatic phase control, which is adapted for implementation in an integrated circuit.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
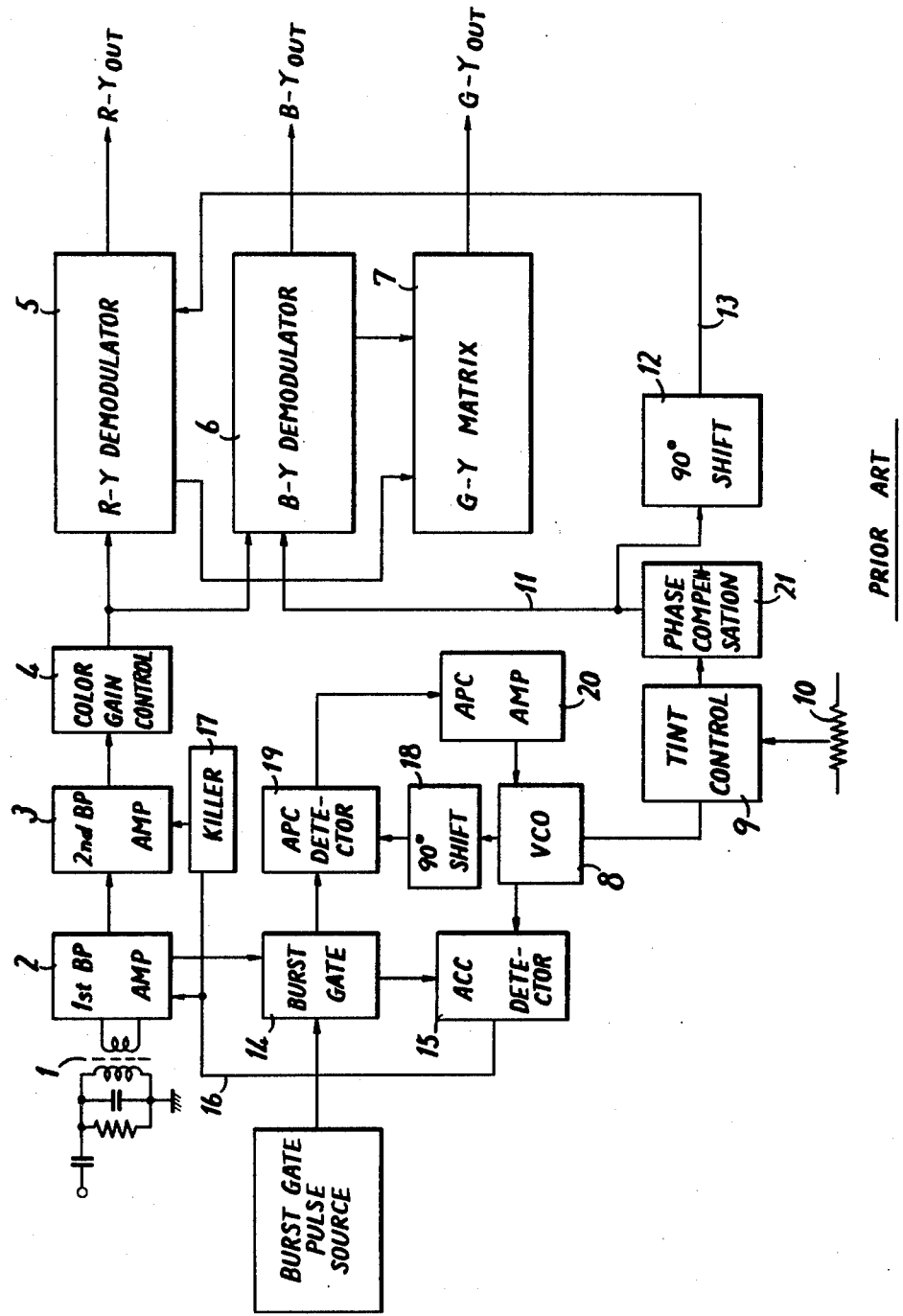
FIG. 1 is a block diagram of a prior art chrominance signal processing circuit in a color television receiver.
Figure 2:
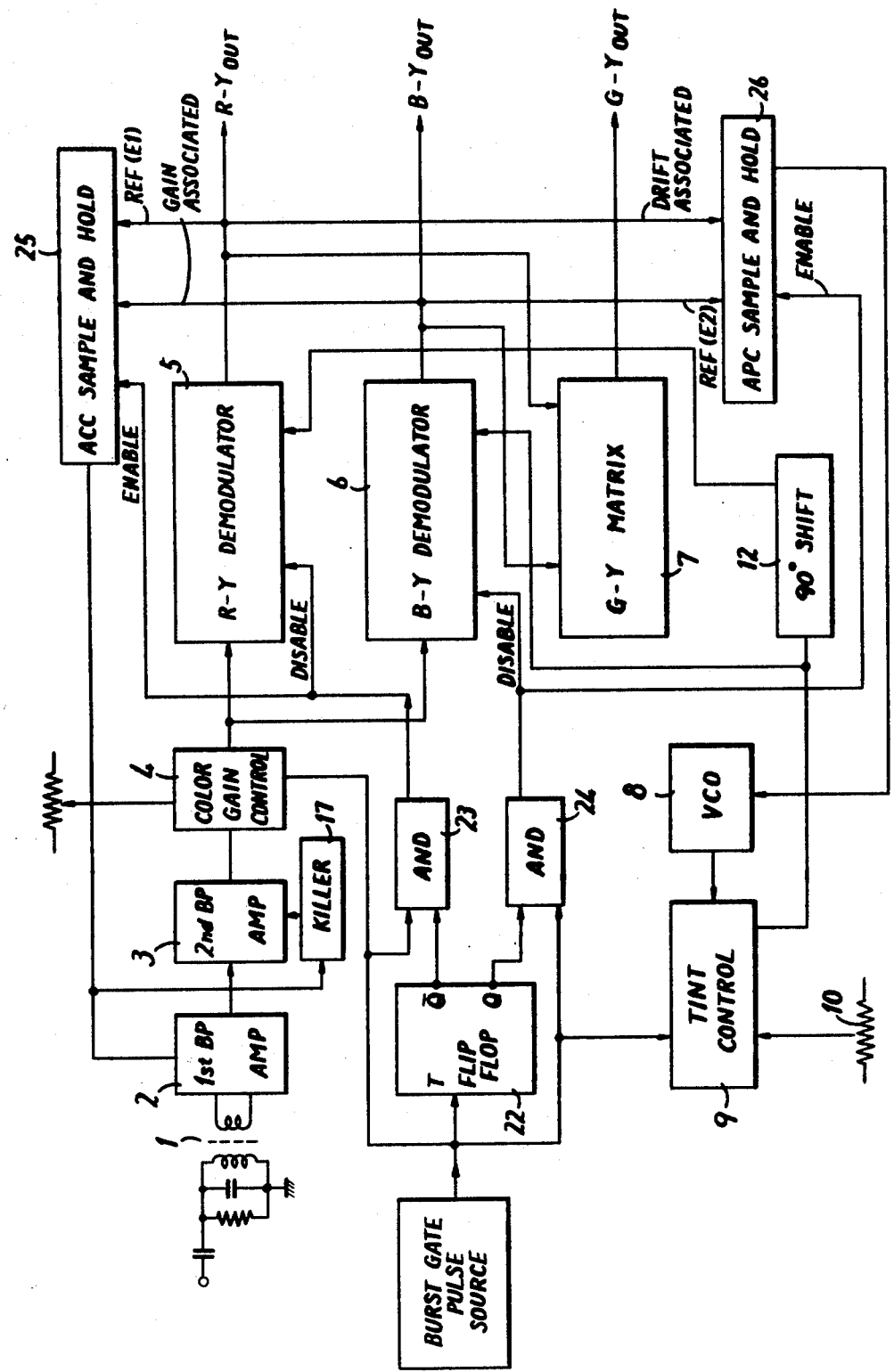
FIG. 2 is a block diagram of one embodiment of the inventive chrominance signal processing circuit in a color television receiver.
Figure 3:
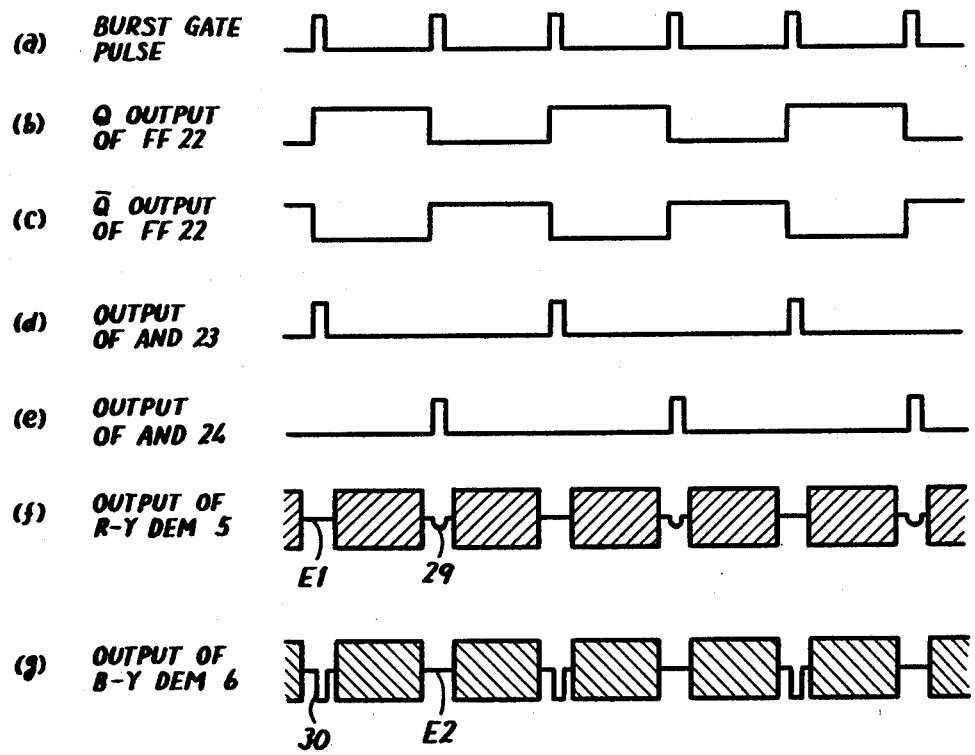
FIG. 3 shows waveforms of the electrical signals at various portions in the FIG. 2 embodiment.

FIG. 2 shows a block diagram of the inventive chrominance signal processing circuit in a color television receiver. The circuit configuration and operation of the FIG. 2 embodiment will be described with simultaneous reference to FIG. 3, which shows waveforms of the electrical signals at various portions in the FIG. 2 embodiment. It is pointed out that since some portions of the FIG. 2 embodiment are the same as those in the FIG. 1 diagram the same reference characters are used to denote the corresponding portions in the FIG. 2 embodiment.

The burst gate pulse, as shown in FIG. 3(a) is applied to a toggle type or T type flip-flop 22. Therefore, the flip-flop 22 alternately assumes a reversed storing state responsive to each burst gate pulse, whereby the high level output is obtained alternately from the Q and $\overline{Q}$ terminals of the flip-flop 22. The waveform of the Q output of the flip-flop 22 is shown in FIG. 3(b) and the waveform of the $\overline{Q}$ output of the flip-flop 22 is shown in FIG. 3(c). It is pointed out that the burst gate pulse has the intervals of one horizontal period and thus the Q and $\overline{Q}$ outputs of the flip-flop 22 assume alternately the high level which lasts for one horizontal line period. The $\overline{Q}$ output of the flip-flop 22 is applied to an AND gate 23 and the Q output of the flip-flop is applied to an AND gate 24. The AND gates 23 and 24 are also connected to receive the burst gate pulse. The waveform of the output of the AND gate 23 is shown in FIG. 3(d) and the waveform of the output of the AND gate 24 is shown in FIG. 3(e). It would be appreciated that the flip-flop 22 and the AND gates 23 and 24 serve to select alternately the burst gate pulse to provide a first and second trains of selected burst gate pulses which are selected at every second burst gate pulse and which trains are complementary to each other.

The output of the AND gate 23 is applied to the R-Y demodulator 5 as a disabling signal to disable the R-Y demodulator 5 as a function of the output of the AND gate 23 and is also applied to a first sample and hold circuit 25 as an enabling signal to enable the first sample and hold circuit 25 as a function of the output of the AND gate 23. Therefore, the R-Y demodulator 5 is disabled while the first sample and hold circuit 25 is enabled only during the pulse period shown in FIG. 3(d).

Similarly, the output of the AND gate 24 is applied to the B-Y demodulator 6 as a disabling signal to disable the B-Y demodulator 6 as a function of the output of the AND gate 24 and is also applied to a second sample and hold circuit 26 as an enabling signal to enable the second sample and hold circuit 26 as a function of the output of the AND gate 23. As a result, the B-Y demodulator 6 is disabled while the second sample and hold circuit 26 is enabled only during the pulse period as shown in FIG. 3(e).

The outputs of the R-Y demodulator 5 and the B-Y demodulator 6 obtainable during every burst gate pulse period are applied to both the first and second sample and hold circuits 25 and 26. Naturally, the outputs of both demodulators 5 and 6 obtainable even during the line scanning period are also applied to the first and second sample and hold circuits 25 and 26. However, since these sample and hold circuits 25 and 26 are not enabled during the line scanning period, the outputs of the demodulators 5 and 6 obtainable during the line scanning period including a chrominance signal, which is to be denoted by a hatched portion in FIG. 3(f) and (g), are not received by the first and second sample and hold circuits 25 and 26, respectively.

Figure 4:
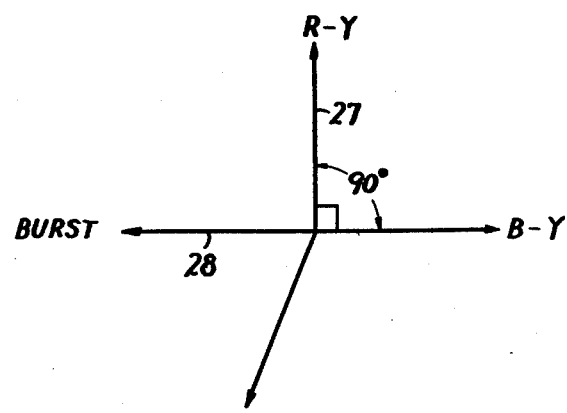
FIG. 4 shows a vector diagram showing the phases of the burst signal and the color difference signals.

Since the R-Y demodulator 5 is disabled for one burst gate pulse period at every second burst gate pulse as shown in FIG. 3(d), a constant level E1 is established in the above described disabled burst gate pulse period, while an output 29 associated with the difference between the phase of the burst signal and the R-Y demodulation axis, i.e. the phase of the R-Y subcarrier, is generated in the not disabled burst gate period. This will be described in more detail with reference to FIG. 4, which shows a vector diagram showing the phases of the burst signal and the color difference signals. As shown in FIG. 4, the R-Y demodulation axis 27 and the burst signal axis 28 must have a phase difference of 90°. However, the phase difference of 90° is changed by virtue of a phase drift in the subcarrier generator 8, a phase drift in other circuits and the like, which causes a level variation associated with the phase drift at the output of the R-Y demodulator 5 in the not disabled burst gate pulse period. Assuming that the above described phase difference between the R-Y demodulator axis and the burst signal axis is exactly 90°, the output of the R-Y demodulator 5 obtainable in the not disabled burst gate pulse period is exactly the reference level E1, since no burst signal component is obtained in the R-Y demodulation axis, but when the above described phase difference becomes larger than 90°, a negative going pulse shaped output is obtained from the R-Y demodulator 5 in the not disabled burst gate pulse period, as shown as the waveform 29 in FIG. 3(f), and when the above described phase difference becomes smaller than 90°, the positive going pulse shaped output is obtained from the R-Y demodulator 5 in the not disabled burst gate pulse period. It would be appreciated that the above described pulse shaped output obtainable from the R-Y demodulator 5 in the not disabled burst gate pulse period could be utilized for the purpose of automatic phase control. In the embodiment shown, however, the second sample and hold circuit 26 is structured to utilize the above described pulse shaped output from the R-Y demodulator 5 as a phase control signal by utilizing the output of the B-Y demodulator 6 in the corresponding burst gate pulse period, i.e. the reference level E2 of the B-Y demodulator 6 as a reference signal for generation of such an automatic phase control signal.

On the other hand, the B-Y demodulator 6 is disabled as a function of the output of the AND gate 24 shown in FIG. 3(e), whereby a reference level E2 is established in the disabled burst gate pulse period, while the B-Y demodulator 6 remains enabled in the other burst gate pulse periods and accordingly a negative going pulse 30 associated with the variation of the color gain is caused. The above described pulse output 30 is applied to the first sample and hold circuit 25 and is utilized to generate an automatic color control signal. In generating the automatic color control signal based on the above described pulse signal 30, however, the reference level output E1 obtainable from the R-Y demodulator 5 is utilized as a reference signal for generation of an automatic color control signal. The first and second sample and hold circuits 25 and 26 also comprise smoothing circuits for smoothing the above described pulse shaped outputs 29 and 30.

The output of the second sample and hold circuit 26 is applied to the subcarrier generator 8 as a voltage control signal. To that end, the subcarrier generator 8 is implemented by a voltage controlled variable frequency oscillator. As a result, the phase of the subcarrier generator 8 is controlled for the purpose of an automatic phase control. Similarly, the output of the first sample and hold circuit 25 is applied to the first bandpass amplifier 2 as a voltage control signal for controlling the gain thereof. To that end, the first bandpass amplifier 2 is implemented by a voltage controlled variable gain amplifier. The output of the first sample and hold circuit 25 can also be applied to the color disabling circuit 17 in the same manner as described in the FIG. 1 diagram, inasmuch as the output of the sample and hold circuit 25 also represents the presence or absence of the burst signal in the composite chrominance signal.

Referring to FIG. 2, it is seen that the burst gate pulse is applied to both the color gain control 4 and the tint control 9. This will be described in some detail. Since the present invention utilizes the outputs of the R-Y demodulator 5 and the B-Y demodulator 6 for the purpose of an automatic color control and an automatic phase control, the levels as manually set by the color gain control 4 and the tint control 9 could influence upon the automatic color control detection and the automatic phase control detection. Therefore, means are provided in the color gain control 4 and the tint control for tentatively disassociating the adjusted levels by the color gain control 4 and by the tint control 9 with the demodulators 5 and 6 only during the burst gate pulse periods in response to the burst gate pulse.

Figure 5:
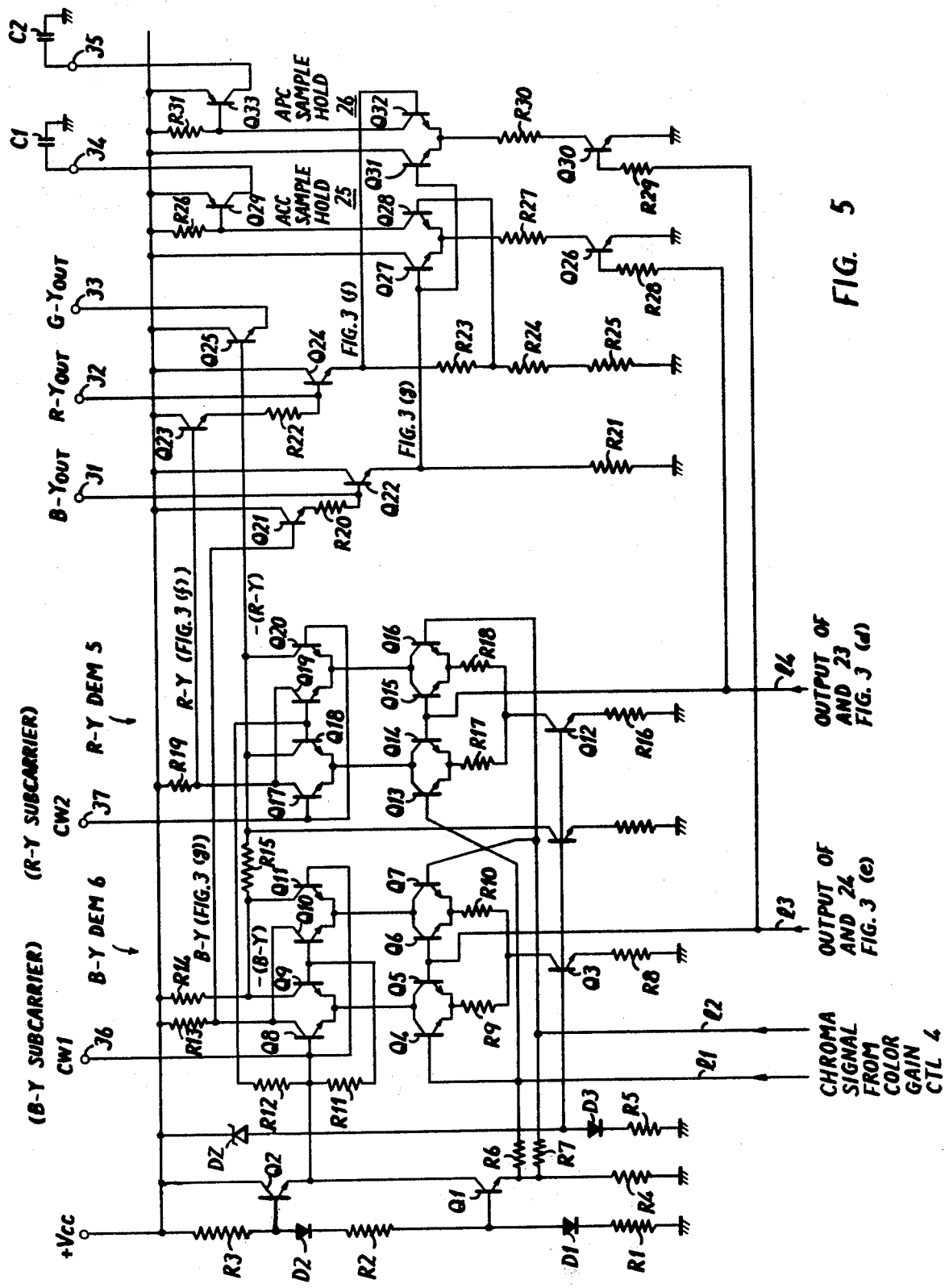
FIG. 5 is a schematic diagram of the chrominance demodulators and the sample and hold circuits in the FIG. 2 embodiment.

FIG. 5 shows a schematic diagram of the R-Y demodulator 5, the B-Y demodulator 6, the first sample and hold circuit 25 and the second sample and hold circuit 26, which are implemented in an integrated circuit. Referring to FIG. 5, the B-Y demodulator 6 comprises a transistor Q3 serving as a constant current source, a differential amplifier including paired transistors Q4 and Q7 connected to receive a chrominance signal in a differential manner through lines 1 and 2, paired transistors Q8 and Q9 commonly connected at the emitter electrodes thereof to the collector electrode of the above described transistor Q4 and paired transistors Q10 and Q11 commonly connected at the emitter electrodes thereof to the collector electrode of the above described transistor Q7, whereby a double balanced type synchronous multiplier is implemented. The base electrodes of the above described transistors Q8 and Q11 are connected to receive the B-Y subcarrier CW1 through a terminal 36. The B-Y signal and the −(B-Y) signal are obtained across load resistors R13 and R14 connected to the collector electrodes of the transistors Q8 and Q10 and Q9 and Q11. Switching transistors Q5 and Q6 are connected in parallel with the above descirbed transistors Q4 and Q7, respectively, and the base electrodes of the switching transistors Q5 and Q6 are connected to receive the output of the AND gate 24 (see FIG. 3(e)) obtained through a line 13. As a result, if and when the transistors Q5 and Q6 are rendered fully conductive during the above described burst gate pulse period shown in FIG. 3(e), the transistors Q4 and Q7 are rendered non-conductive, whereby the B-Y demodulator 6 is disabled, while the transistors Q5 and Q6 are rendered non-conductive during the time period other than the above described burst gate pulse period shown in FIG. 3(e) and accordingly the transistors Q4 and Q7 are rendered conductive, whereby the B-Y demodulator 6 is enabled. During the time period when the above described transistors Q4 and Q7 are rendered conductive thereby to enable the B-Y demodulator 6, a normal demodulation operation is performed, whereby a chrominance signal as shown by a hatched portion in the FIG. 3(e) is obtained in the line scanning period and a negative going pulse shaped output 30 associated with the gain of the burst signal is obtained in the not disabled burst gate pulse period. On the contrary, when the transistors Q5 and Q6 are rendered conductive and the transistors Q4 and Q7 are rendered non-conductive, a constant current flows through the transistors Q5 and Q6, thereby to establish a constant level potential E2 shown in FIG. 3(g) across the resistors R13 and R14 as a detection output of the B-Y demodulator 6.

The R-Y demodulator 5 comprises a transistor Q12 serving as a constant current source, paired transistors Q13 and Q16 connected to receive the chrominance signal from the color gain control 4 in a differential manner through the lines 11 and 12, paired transistors Q17 and Q18 commonly connected at the emitter electrodes to the collector electrode of the transistor 13 and paired transistors Q19 and Q20 commonly connected at the emitter electrodes thereof to the collector electrode of the transistor Q16, whereby a double balanced type synchronous multiplier is implemented. The base electrodes of the transistors Q17 and Q20 are connected to recieve the R-Y subcarrier CW2 through a terminal 37 which has a phase shift of 90° with respect to that of the B-Y subcarrier CW1. The R-Y signal and the −(R-Y) signal are obtained across load resistors R19, and R14 and R15, respectively. Switching transistors Q14 and Q15 are connected in parallel with the transistors Q13 and Q16, respectively, and the base electrodes of the transistors Q14 and Q15 are connected to receive the output pulse of the AND gate 23 shown in FIG. 3(d) through a line 14, so that the transistors Q13 and Q16 are rendered conductive or non-conductive as a function of the output of the AND gate 23, shown in FIG. 3(d). As a result, as fully described with reference to FIG. 2, the R-Y demodulator 5 provides the output of the waveform shown in FIG. 3(f). It is pointed out that since in the FIG. 5 embodiment the demodulators 5 and 6 are implemented in a double balanced type, assuming that the output signal as shown in FIG. 3(f) is obtained across the load resistor R19 of the R-Y demodulator 5, the output of the 180° phase difference is obtained across the resistors R14 and R15, and similarly when the output as shown in FIG. 3(g) is obtained across the load resistor R13 of the B-Y demodulator 6 the output of the 180° phase difference is obtained across the resistor R14.

The signals shown in FIG. 3(g) and (f) developed across the resistors R13 and R19, respectively, are withdrawn through the emitter electrodes of the subsequent stage transistors Q21 and Q23 to the output terminals 31 and 32, and further applied through the emitter followers Q22 and Q24 to the first and second sample and hold circuits 25 and 26, respectively. On the other hand, the −(B-Y) signal developed across the resistor R14 and the −(R-Y) signal developed across the resistors R14 and R15 are properly added to provide a G-Y signal. The G-Y signal is withdrawn from the emitter electrode of the transistor Q25 to the output terminal 33.

The first sample and hold circuit 25 comprises a transistor Q26 serving as a constant current source and paired transistors Q27 and Q28 and a capacitor C1 externally connected at the terminal 34. The base electrode of the transistor Q26 is connected to the line 14. Therefore, the first sample and hold circuit 25 is enabled only in the period of the burst gate pulse obtainable from the AND gate 23 shown in FIG. 3(d). At that time, the output 30 shown in FIG. 3(g) obtained from the B-Y demodulator 6 applied to the base electrode of the transistor Q27 is compared with the constant potential, i.e. the emitter potential of the transistor Q24 based on the reference level output from the R-Y demodulator 5 applied to the base electrode of the transistor Q28, whereby an output having the magnitude and the sense associated with the difference is developed across the load resistor R26. A pulse shaped signal developed across the resistor R26 is applied through the transistor Q29 and the terminal 34 to the externally connected capacitor C1 and is smoothed thereby. The voltage signal as smoothed by the capacitor C1 is applied to the first bandpass amplifier 2 and the color disabling circuit 17, as described with reference to FIG. 2. If and when the first bandpass amplifier 2 and the color disabling circuit 17 are implemented in the same integrated circuit chip, then the collector electrode of the transistor Q29 can be directly coupled to the first bandpass amplifier 2 and the color disabling circuit 17.

The second sample and hold circuit 26 is similarly structured. The output of the AND gate 24 shown in FIG. 3(e) is applied through the line 13 to the base electrode of the constant current source transistor Q30, whereby the transistor Q30 is rendered conductive only during the pulse period shown in FIG. 3(e) and thus the second sample and hold circuit 26 is enabled only during the pulse period shown in FIG. 3(e) and thus the second sample and hold circuit 26 is enabled only during the pulse period shown in FIG. 3(e) while the second sample and hold circuit 26 is disabled during the time period other than the pulse period shown in FIG. 3(e). The base electrode of one transistor Q32 of the transistor pair is connected to receive the output signal representing the phase drift o the R-Y signal obtained from the R-Y demodulator 5 and the base electrode of the other transistor Q31 of the transistor pair is connected to receive as a reference the output E2 representing the reference level of the B-Y demodulator 6. An automatic phase control signal is obtained from the load resistor R31 and is applied through the transistor Q33 to a capacitor C2 externally connected to the terminal 35 and is smoothed thereby. The voltage signal as smoothed by the capacitor C2 is applied to the subcarrier generator 8 as a voltage control signal.

Figure 6:
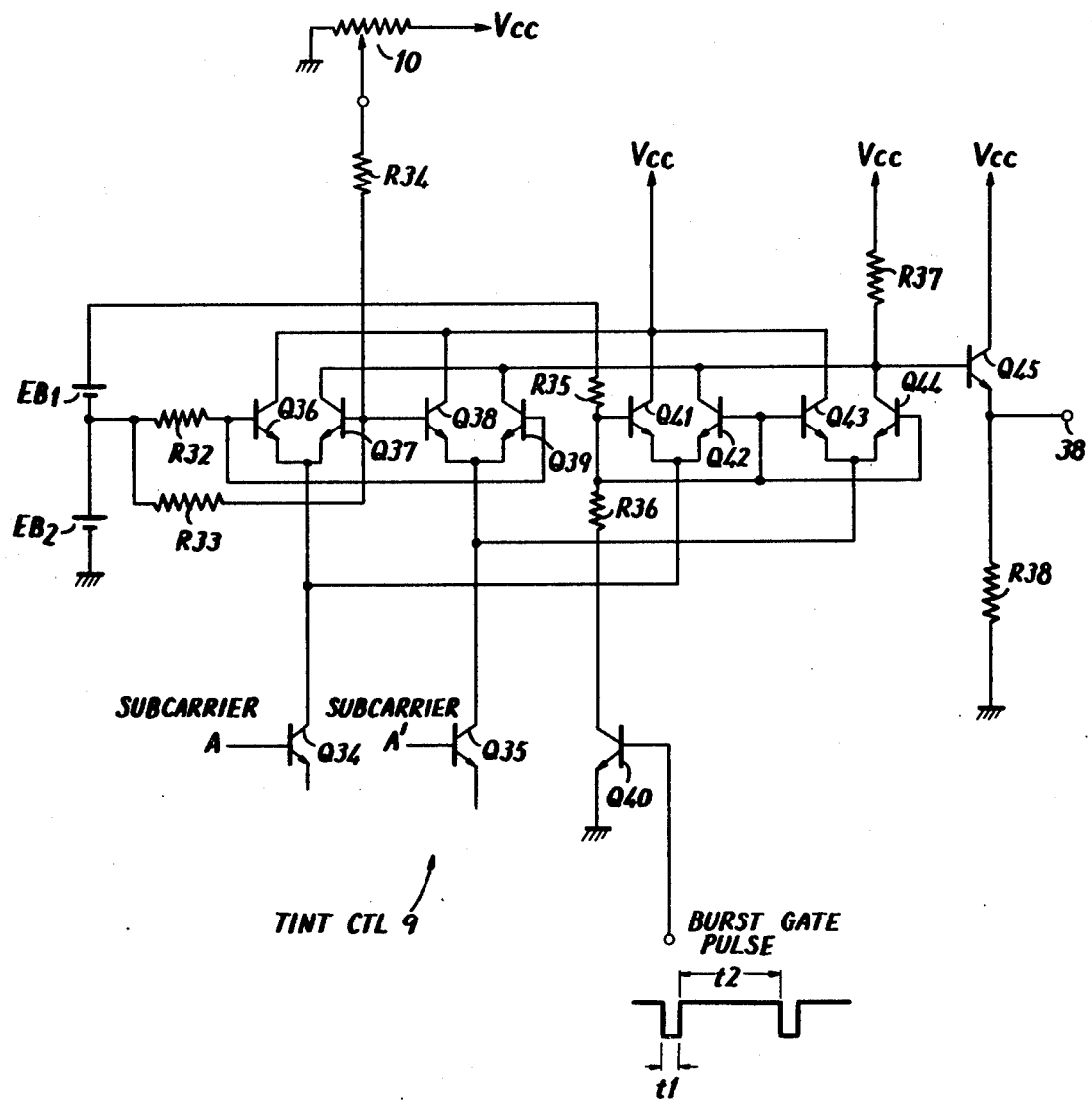
FIG. 6 is a schematic diagram of the tint control shown in the FIG. 2 embodiment.

FIG. 6 shows a schematic diagram of the tint control 9 shown in FIG. 2. The subcarrier A obtained from the voltage controlled oscillator type subcarrier generator 8 and the subcarrier A′ as 90° phase shifted by means of a phase shifter included in the tint control 9 but not shown in FIG. 6 are applied to the base electrodes of the transistors Q34 and Q35, respectively. The burst gate pulse is applied to the base electrode of the transistor Q40. Therefore, the transistor Q40 is rendered conductive during the scanning period t2 and is rendered non-conductive during the burst gate pulse period t1. Since the resistance values of the resistors R35 and R36 have been properly selected, if and when the transistor Q40 is rendered fully conductive, the base potential of the transistors Q41, Q42, Q43 and Q44 is much lower than the base potential of the transistors Q36, Q37, Q38 and Q39, irrespective of whatsoever level the base potential of the transistors Q36, Q37, Q38 and Q39 is, with the result that the transistors Q41, Q42, Q43 and Q44 are rendered non-conductive. Therefore, the subcarriers A and A′ are withdrawn through the transistors Q36, Q37, Q38 and Q39 and combined at the base electrode of the emitter flower Q45 and is obtained at the output terminal 38. In this situation, the signal is subjected to an adjustment of the variable resistor 10 and thus a tint control can be achieved as desired through adjustment of the variable resistor 10 and the output as set by the variable resistor is obtained from the terminal 38.

However, if and when the transistor Q40 is rendered non-conductive responsive to the burst gate pulse t1, the base potential of the transistors Q41, Q42, Q43 and Q44 becomes higher than the base potential of the transistors Q36, Q37, Q38 and Q39 by the value EB1, and the transistors Q36, Q37 Q38 and Q39 are rendered non-conductive with the result that the subcarriers A and A′ are withdrawn through the transistors Q41, Q42 Q43 and Q44 and combined at the base electrode of the transistor Q45, which combined output is withdrawn from the output terminal 38. Accordingly, in this situation, the phase of the output signal is determined only dependent upon the division ratio of the current in the transistors Q41, Q42, Q43 and Q44, without being affected at all by adjustment of the variable resistor 10. In other words, the output signal as released from the set state in the variable resistor 10 is obtained. Since the base electrode of the transistor Q40 is supplied with the negative going burst gate pulse during the time period t1 and is supplied with the positive voltage during the scanning time period t2, the outputs obtainable from the R-Y demodulator 5 and the B-Y demodulator 6 during the burst gate pulse period t1 for the purpose of automatic phase control are not subjected to the influence of the variable resistor 10, with the result that the subcarrier generator 8 is controlled as desired. On the other hand, during the scanning period t2, the outputs of the R-Y demodulator 5 and the B-Y demodulator 6 are subjected to the influence of the set state of the variable resistor 10 and thus an automatic phase control as set by the variable resistor can be achieved. The output of the output terminal 38 is applied to the terminal 36 in FIG. 5 and is also applied through the 90° phase shifter 12 shown in FIG. 2 to the terminal 37.

Although in the foregoing only the tint control 9 was described in detail with reference to FIG. 6, it is pointed out that the color gain control 4 can be structured in substantially the same manner. Thus, it is not believed necessary to describe the color gain control 4 in such detail, inasmuch as the same can be implemented by those skilled in the art in the light of the disclosure with reference to the FIG. 6 embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A chrominance signal processing circuit in a color television receiver, comprising:
   means for amplifying a composite chrominance signal including a burst signal in a line blanking period and a chrominance signal suppression modulated on a subcarrier during a line scanning period,
   means for providing a burst gate pulse during said line blanking period,
   means for generating a subcarrier,
   first chrominance demodulating means responsive to said composite chrominance signal amplifying means and said subcarrier generating means for providing a first chrominance demodulated signal in said line scanning period and for providing a first signal representing the magnitude of said burst signal in said blanking period,
   second chrominance demodulating means responsive to said composite chrominance signal amplifying means and said subcarrier generating means for providing a second chrominance demodulated signal in said line scanning period and for providing a second signal representing the phase drift of said subcarrier in said blanking period,
   first sample and hold means responsive to said burst gate pulse to be enabled and responsive to said first chrominance demodulating means for sampling said first magnitude representing signal and holding a first level signal representing said first magnitude representing signal, and
   second sample and hold means responsive to said burst gate pulse to be enabled and responsive to said second chrominance demodulating means for sampling said second phase drift representing said second phase drift representing signal,
   said composite chrominance signal amplifying means comprising a voltage controlled variable gain amplifying means connected to receive as a voltage control signal said first level signal representing said magnitude representing signal,
   said subcarrier generating means comprising a voltage controlled variable frequency oscillating means connected to receive as a voltage control signal said second level signal representing said phase drift representing signal;
   means coupled to said subcarrier generating means for adjusting the phase of said subcarrier; and
   means coupled to said phase adjusting means and responsive to said burst gate pulse for making said subcarrier generating means unresponsive to said phase adjusting means.

2. A chrominance signal processing circuit in a color television receiver in accordance with claim 1, wherein said burst gate pulse providing means comprises means responsive to said burst gate pulse for providing first and second trains of selected burst gate pulses which are complementary to each other,
   said first sample and hold means is adapted to be responsive to said first train of selected burst gate pulses to be enabled and responsive to said first chrominance demodulating means for sampling said first magnitude representing signal and holding said first level signal representing said first magnitude representing signal, and
   said second sample and hold means is adapted to be responsive to said second train of selected burst gate pulses to be enabled and responsive to said second chrominance demodulating means for sampling said second phase drift representing signal and holding a second level signal representing said second phase drift representing signal.

3. A chrominance signal processing circuit in a color television receiver in accordance with claim 2, wherein said first chrominance demodulating means is structured to be disabled responsive to said first train of selected burst gate pulses for the time period of said first train of selected burst gate pulses, and
   said second chrominance demodulating means is structured to be disabled responsive to said second train of selected burst gate pulses for the time period of said second train of selected burst gate pulses.

4. A chrominance signal processing circuit in a color television receiver in accordance with claim 2, wherein said first and second burst gate pulse train providing means comprises means responsive to said burst gate pulses for alternatively selecting said burst gate pulses as said first and second trains of selected burst gate pulses.

5. A chrominance signal processing circuit in a color television receiver in accordance with claim 4, wherein said alternate selecting means comprises a toggle type flip-flop.

6. A chrominance signal processing circuit in a color television receiver in accordance with claim 1, wherein said composite chrominance signal amplifying means comprises means for adjusting the gain of said composite chrominance signal amplifying means.

7. A chrominance signal processing circuit in a color television receiver in accordance with claim 6, wherein said composite chrominance signal amplifying means further comprises means coupled to said gain adjusting means and responsive to said burst gate pulse for making said composite chrominance signal amplifying means irresponsive to said gain adjusting means.

8. A chrominance signal processing circuit in a color television receiver in accordance with claim 1, which further comprises means responsive to said first sample and hold means for providing a signal representing the presence or absence of said burst signal in said composite chrominance signal for disabling said composite chrominance signal amplifying means when said burst signal is not included in said composite chrominance signal.

9. A chrominance signal processing circuit in a color television receiver in accordance with claim 1, which further comprises means responsive to said first and second chrominance demodulating means for providing a third chrominance demodulated signal.

10. A chrominance signal processing circuit in a color television receiver in accordance with claim 1, wherein said first chrominance demodulating means comprises B-Y color difference signal demodulating means for providing a B-Y color difference signal, and said second chrominance demodulating means comprises R-Y color difference signal demodulating means for providing an R-Y color difference signal.

11. A chrominance signal processing circuit in a color television receiver in accordance with claim 10, which further comprises G-Y color difference signal providing means operatively coupled to said B-Y color difference signal demodulating means and said R-Y color difference signal demodulating means for providing a G-Y color difference signal.

12. A chrominance signal processing circuit in a color television receiver in accordance with claim 11, wherein said subcarrier generating means comprises a subcarrier generator for generating a first subcarrier signal to said B-Y color difference signal demodulating means, and phase shift means coupled to said subcarrier generator for phase shifting by 90° said first subcarrier signal for providing a second subcarrier signal having a phase difference of 90° with respect to said first subcarrier signal to said R-Y color difference signal demodulating means.

13. A chrominance signal processing circuit in a color television receiver, comprising:
means for amplifying a composite chrominance signal including a burst signal in a line blanking period and a chrominance signal suppression modulated on a subcarrier during a line scanning period,
means for providing a burst gate pulse during said line blanking period,
means for generating a subcarrier,
first chrominance demodulating means responsive to said composite chrominance signal amplifying means and said subcarrier generating means for providing a first chrominance demodulated signal in said line scanning period and for providing a first signal representing the magnitude of said burst signal in said blanking period,
second chrominance demodulating means responsive to said composite chrominance signal amplifying means and said subcarrier generating means for providing a second chrominance demodulated signal in said line scanning period and for providing a second signal representing the phase drift of said subcarrier in said blanking period,
first sample and hold means responsive to said burst gate pulse to be enabled and responsive to said first chrominance demodulating means for sampling said first magnitude representing signal and holding a first level signal representing said first magnitude representing signal, wherein said first sample and hold means is responsive to said second chrominance demodulating means and comprises means for comparing the output of said first chrominance demodulating means with the output of said second chrominance demodulating means as a reference for providing said first magnitude representing signal, and
second sample and hold means responsive to said burst gate pulse to be enabled and responsive to said second chrominance demodulating means for sampling said second phase drift representing signal and holding a second level signal representing said second phase drift representing signal,
said composite chrominance signal amplifying means comprising a voltage controlled variable gain amplifying means connected to receive as a voltage control signal said first level signal representing said magnitude representing signal,
said subcarrier generating means comprising a voltage controlled variable frequency oscillating means connected to receive as a voltage control signal said second level signal representing said phase drift representing signal.

14. A chrominance signal processing circuit in a color television receiver, comprising:
means for amplifying a composite chrominance signal including a burst signal in a line blanking period and a chrominance signal suppression modulated on a subcarrier during a line scanning period,
means for providing a burst gate pulse during said line blanking period,
means for generating a subcarrier,
first chrominance demodulating means responsive to said composite chrominance signal amplifying means and said subcarrier generating means for providing a first chrominance demodulated signal in said line scanning period and for providing a first signal representing the magnitude of said burst signal in said blanking period,
second chrominance demodulating means responsive to said composite chrominance signal amplifying means and said subcarrier generating means for providing a second chrominance demodulated signal in said line scanning period and for providing a second signal representing the phase drift of said subcarrier in said blanking period,
first sample and hold means responsive to said burst gate pulse to be enabled and responsive to said first chrominance demodulating means for sampling said first magnitude representing signal and holding a first level signal representing said first magnitude representing signal, and
second sample and hold means responsive to said burst gate pulse to be enabled and responsive to said second chrominance demodulating means for sampling said second phase drift representing signal and holding a second level signal representing said second phase drift representing signal, wherein said second sample and hold means is responsive to said first chrominance demodulating means and comprises means for comparing the output of said second chrominance demodulating means with the output of said first chrominance demodulating means as a reference for providing said second phase drift representing signal,
said composite chrominance signal amplifying means comprising a voltage controlled variable gain amplifying means connected to receive as a voltage control signal said first level signal representing said magnitude representing signal,
, said subcarrier generating means comprising a voltage controlled variable frequency oscillating means connected to receive as a voltage control signal said second level signal representing said phase drift representing signal.

* * * * *